United States Patent
Koestler et al.

(10) Patent No.: US 10,450,786 B2
(45) Date of Patent: Oct. 22, 2019

(54) VEHICLE WITH AN IMPACT DAMPING ARRANGEMENT BETWEEN THE VEHICLE BODY AND A VEHICLE DOOR OR VEHICLE PANEL

(71) Applicant: Bayerische Motoren Werke Aktiengesellschaft, Munich (DE)

(72) Inventors: Ulrich Koestler, Hebertshausen (DE); Anton Kieferl, Schweitenkirchen (DE); Marcus Knechtel, Kirchheim (DE); Markus Springsklee, Munich (DE); Walter Widl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 155 days.

(21) Appl. No.: 15/330,773

(22) Filed: Nov. 7, 2016

(65) Prior Publication Data
US 2017/0067279 A1    Mar. 9, 2017

Related U.S. Application Data

(63) Continuation of application No. PCT/EP2015/058538, filed on Apr. 21, 2015.

(30) Foreign Application Priority Data

May 7, 2014    (DE) .......................... 10 2014 208 586

(51) Int. Cl.
*E05F 5/02*    (2006.01)
*E05F 5/10*    (2006.01)
(Continued)

(52) U.S. Cl.
CPC .............. *E05F 5/025* (2013.01); *E05F 5/022* (2013.01); *E05F 5/10* (2013.01); *F16F 9/54* (2013.01); *F16F 9/56* (2013.01); *E05Y 2900/536* (2013.01)

(58) Field of Classification Search
None
See application file for complete search history.

(56) References Cited

U.S. PATENT DOCUMENTS 4,033,616 A * 7/1977 Sheesley .................. E05B 77/48
                                                                292/216
4,693,454 A * 9/1987 Tsuchiya .................... E05F 5/10
                                                                  16/66
(Continued)

FOREIGN PATENT DOCUMENTS

DE    31 50 081 A1    7/1982
DE    201 07 426 U1    8/2001
(Continued)

OTHER PUBLICATIONS

International Search Report (PCT/ISA/210) issued in PCT Application No. PCT/EP2015/058538 dated Jul. 27, 2015 with English translation (nine pages).

(Continued)

*Primary Examiner* — Catherine A Kelly
(74) *Attorney, Agent, or Firm* — Crowell & Moring LLP

(57) ABSTRACT

A vehicle includes at least one vehicle door or vehicle flap which forms a first body, a vehicle bodyshell which forms a second body, and an impact damper arrangement. The impact damper arrangement is configured such that, when the vehicle door or vehicle flap moves toward the vehicle bodyshell, a first movement section is passed through first, and then a second movement section is passed through. The first movement section is arranged such that movement along the first movement section comes to an end when a lock and closing element come into contact with one another.

17 Claims, 8 Drawing Sheets

(51) Int. Cl.
*F16F 9/54* (2006.01)
*F16F 9/56* (2006.01)

(56) References Cited

U.S. PATENT DOCUMENTS

| | | | |
|---|---|---|---|
| 5,697,477 A | 12/1997 | Hiramoto et al. | |
| 6,553,617 B1* | 4/2003 | Salice | E05F 5/02 |
| | | | 16/82 |
| 7,850,219 B2* | 12/2010 | Townson | E05D 11/084 |
| | | | 296/50 |
| 9,493,976 B2* | 11/2016 | Hattori | E05F 5/022 |
| 2006/0016650 A1 | 1/2006 | Kneip et al. | |
| 2017/0096850 A1* | 4/2017 | Hopkins | E05F 5/02 |
| 2017/0130502 A1* | 5/2017 | Collene | E05F 3/20 |
| 2017/0314312 A1* | 11/2017 | Born | F15B 15/1461 |

FOREIGN PATENT DOCUMENTS

| | | | |
|---|---|---|---|
| DE | 10 2004 008 046 A1 | 3/2005 | |
| DE | 103 60 833 A1 | 7/2005 | |
| DE | 102008058221 A1 * | 5/2010 | ............. E05F 5/022 |
| EP | 0 334 253 A1 | 9/1989 | |
| FR | 2 751 714 A1 | 1/1998 | |
| JP | 2010-228675 A | 10/2010 | |

OTHER PUBLICATIONS

German-language Written Opinion (PCT/ISA/237) issued in PCT Application No. PCT/EP2015/058538 dated Jul. 27, 2015 (nine pages).

German Search Report issued in counterpart German Application No. 10 2014 208 586.1 dated Mar. 9, 2015 with partial English translation (12 pages).

* cited by examiner

VEHICLE WITH AN IMPACT DAMPING ARRANGEMENT BETWEEN THE VEHICLE BODY AND A VEHICLE DOOR OR VEHICLE PANEL

CROSS REFERENCE TO RELATED APPLICATIONS

This application is a continuation of PCT International Application No. PCT/EP2015/058538, filed Apr. 21, 2015, which claims priority under 35 U.S.C. § 119 from German Patent Application No. 10 2014 208 586.1, filed May 7, 2014, the entire disclosures of which are herein expressly incorporated by reference.

BACKGROUND AND SUMMARY OF THE INVENTION

Embodiments of the invention relate to a vehicle having at least one vehicle door or vehicle flap which forms a first body and having a vehicle bodyshell which forms a second body.

In a vehicle, the vehicle door or vehicle flap (bodyshell flap of a vehicle) is normally pivotably attached to the vehicle bodyshell and, in the closed state, can be fixed to the bodyshell by way of at least one lock on the vehicle bodyshell, which lock interacts with a closing element, for example a lock striker or a catch. A vehicle of said type is equipped with an impact damper arrangement for damping impacts between the vehicle bodyshell and the vehicle door or vehicle flap during the closing of the vehicle door or vehicle flap, wherein the impact damper arrangement has a damping device which is arranged so as to act between the vehicle bodyshell and the vehicle door or vehicle flap and which has a first movement section, in which damping is performed, and a second movement section, in which no damping is performed.

During the closing of a front flap of a vehicle, for example, said front flap can, if closed with too much force, strike the headlamps and the front paneling (kidney grille). Therefore, until now, it has been necessary for interstices to be provided between the front flap and the headlamps or the front paneling, which interstices are large enough to prevent damage as a result of such impacting. A minimum interstice may in this case be approximately 3.5 mm (that is to say nominally approximately 5.3 mm±1.8 mm). For visual reasons in particular, however, it is sought for said interstices between front flap and front paneling to be made ever smaller.

Furthermore, a minimum closing speed of approximately 1.2 to 1.5 m/s is necessary for the lock or locks in order to securely close the front flap. Damage to components such as radiator grille, headlamps, bumpers and/or side wall may arise already at a speed of 2.5 to 3.0 m/s ("misuse speed"). Furthermore, such impacting of the front flap can also give rise to inadvertent and unnoticed adjustment of the headlamp setting.

In general, it is therefore the case that damping of the movement of the front flap (or else of doors or other bodyshell flaps of a vehicle) is performed before it strikes the lock. It is for example possible for locks with damping action, retraction-damped gas springs, and buffers with damping action to be used for this purpose.

Elements integrated in the lock can effect a damping action until the vehicle flap is almost closed. This therefore requires a large amount of closing energy, and the damping is performed only shortly before lock contact occurs. For example, a closing speed of approximately 2 m/s (with damper) may be necessary for secure closure (approximately 1.5 m/s without damper).

In the case of gas springs, in particular retraction-damped gas springs, leading damping is performed. Such gas springs are however of low effectiveness and therefore do not ensure optimum damping. Furthermore, such gas springs are expensive.

In the case of conventional front flap locks, the front flap is raised by approximately 20 to 35 mm for the purposes of opening front flap. This corresponds to the "catch position". Vehicles with air inlets integrated into the front flap may furthermore have a deployable handle for raising the front flap. This is however not possible in the case of front flaps which have a cut-in or overlying configuration, such as are often used.

The above damping systems have disadvantages insofar as the damping begins only when the lock and lock striker are already in engagement, or shortly before the engagement. Since the damping begins at a late point in time, it is also the case that damping is performed during the closing process, and thus the closing convenience is impaired. In this way, the user is motivated to close the front flap with high force. Furthermore, the range between minimum closing speed and impacting over travel may be small, in particular owing to the requirement for the small gap widths. In this way, impacting over travel of the flap such that it impacts against adjacent components is possible, in particular if the front flap is closed with high force.

DE 10 2004 008 046 A1 has disclosed a stop buffer for a vehicle door or vehicle flap, which stop buffer has a main body composed of an elastic material, wherein, in the main body, there is situated at least one cavity which is preferably completely filled with a liquid. During the deformation of the stop buffer, energy is absorbed owing to the elasticity of the elastic material and the viscosity of the filling. For this purpose, during the closing of the vehicle door or vehicle flap, a pressure fluid is forced from a first chamber of the stop buffer into a second chamber through an opening provided in a diaphragm. Here, during the compression, a valve body which is equipped with axial channels and which tapers to a point is moved into the diaphragm opening, whereby the opening cross section is reduced, and thus the damping force increases.

DE 103 60 833 A1 relates to a gas spring for a front flap of a vehicle. In said document, the stated problem is described as being that conventional gas springs, which support the weight of a front flap during opening or closing of the front flap, have the disadvantage that, in the case of a collision of a cyclist or a pedestrian against the front flap, a spring force action of the gas spring still exists which impedes a yielding of the front flap in the region of the connection of the gas spring owing to the spring force that still exists there. To solve said problem, the gas spring can, in the closed state of the front flap, still perform an additional travel in a compression direction, over which travel only a low level of damping is realized because, in said range of the additional travel, the damping of the gas spring is reduced.

DE 31 50 081 A1 relates to an air pressure impact damper. In said document, it is stated as being a problem that such air pressure impact dampers have a spring-back tendency owing to the compressibility of the air. To solve said problem, the compression chamber of the air pressure impact damper has a connection between the compression chamber and the atmosphere, wherein a throttle valve element is provided in said connection. Via said throttled connection to the atmosphere, it is possible, during the compression of the air pressure impact damper, for air to emerge in controlled fashion from the compression chamber, such that an undesired pressure increase in the compression chamber, which would lead to a rebound of the piston, does not occur.

FR 2 751 714 A1 has a brake system for a unit composed of two mobile elements. Said brake system is provided for example for a vehicle ashtray that can be deployed out of a receiving device. The movable part of the vehicle ashtray is forced into the open position under the action of a spring. A gearwheel-toothed rack arrangement acts as a brake element, wherein the gearwheel that is in engagement with toothed racks acts as a friction brake. The gearwheel engages with the toothed racks not over the entire movement travel of the ashtray but only during the deployment of the ashtray. In the retracted state and in the deployed state, the gearwheel is not in engagement with the toothed racks. In the closed position of the ashtray, in which a locking element (not described in any more detail) is active, the ashtray is subjected to the full pressure action of the spring force, whereas the gearwheel that acts as brake element is not in engagement with the toothed racks. In this closed state, it is thus the case that the movable part of the ashtray is subjected to the spring force, which must be supported by the locking element. Accordingly, the spring force acts on the ashtray even during the pushing-in process and during the locking process. The pushing-in movement is thus damped, until locking has taken place, by the spring force that counteracts said pushing-in movement.

JP 2010-228 675 A presents a stopper for a hood, which stopper is intended, by way of the movement of an impact-absorbing movable element, to absorb the impact that occurs during the closing of the hood. Said impact-absorbing element may be provided either on the hood or on a vehicle bodyshell. A movable plunger which is equipped with a piston is movable into a cylindrical plunger receptacle counter to the force of a spring. In one variant, the spring, which runs in a direction of movement of the plunger, is bent inwardly into the cylinder such that the plunger is moved beyond a spring dead center, wherein, in the beyond-dead-center position, said plunger is retracted further by the spring. The time at which the piston-like plunger is pulled into the receptacle by the spring is not specified.

U.S. Pat. No. 5,697,477 A presents and describes an air spring damper which is designed as a piston-cylinder unit and which can be used for example as a damper for the glove compartment cover in an automobile. The mode of operation of said damper consists in that, during the movement of the piston, air flows from the chamber situated on one side of the piston, the volume of which chamber is decreased in size during the movement, through a throttle opening in the piston into the other chamber situated on the other side of the piston, which chamber is increased in size during the movement of the piston. The intensity of the damping is determined by the size of the throttle opening. An O-ring is inserted as a piston ring into a groove on the circumference of the piston and, by way of its friction exerted on the cylinder wall during the movement of the piston, likewise generates a braking force of the piston movement. Shortly before the maximally deployed position of the piston rod connected to the piston is reached, the piston passes into a region of the cylinder in which the diameter of the cylinder wall gradually decreases slightly, such that the friction force that acts between the O-ring and the cylinder wall is intensified, whereby the braking force that is exerted on the piston movement is also intensified. The opening movement of the glove compartment cover is thus braked shortly before the maximally opened position of the glove compartment cover is reached. In addition to the throttle opening in the piston, it is possible for axial grooves to be provided in the cylinder wall, which axial grooves likewise allow the air to flow past the piston during the movement thereof. Said axial grooves are however not provided in the region in which the cylinder wall narrows, such that, there, the full braking action described above is maintained. The damper presented and described here serves for damping the opening movement of the flap.

DE 201 07 426 U1 describes a brake regulator with air or liquid damping. A brake regulator of said type is provided in particular for end position damping of drawers or doors. Said brake regulator is designed as a piston-cylinder unit, wherein, in a region of the cylinder wall, there may be provided an axial groove through which air can flow past the piston from the air chamber formed on one side of the piston into the air chamber formed on the other side of the piston. Furthermore, it is also the case that a flow opening formed in the manner of a check valve is provided in the piston. During the compression of the piston-cylinder unit, said check valve is closed, and the air in the cylinder chamber situated in front of the piston is compressed, whereby a damping force is built up. When the piston reaches the region of the cylinder in which the axial groove is provided in the cylinder wall, it is possible for air to flow past the piston from the compression chamber into the air chamber behind the piston, and the damping force is reduced. Shortly before the maximally retracted position of the piston is reached, a further air outflow groove is provided in the cylinder wall, through which air outflow groove a further dissipation of pressure in the compression chamber is then realized. Said further pressure dissipation is intended to take place such that the positive pressure in the compression chamber is abruptly fully dissipated. In this final travel segment of the piston, there is thus no longer a damping force. As a result of said abrupt dissipation of the damping force in the end position of the piston, it is achieved that the compression movement of the piston-cylinder unit at the end of the piston movement does not lead to a recoil reaction owing to the positive pressure in the compression chamber.

EP 0 334 253 A1 presents and describes a gas spring which, for the purposes of supporting the weight of a movable component, for example of a luggage compartment flap, is provided in a motor vehicle between the bodyshell of the motor vehicle and the movable structural element. There, a device for controlling the reaction forces of the gas spring is provided, which device has the effect that, when the movable component (for example the luggage compartment flap) is closed, that is to say the gas spring is situated in its compressed state, the gas spring no longer exerts spring-induced pressure forces on the luggage compartment flap. Shortly before the complete closure of the luggage compartment flap, a spring plate, which is acted on by the spring force, of the gas spring runs against a stop provided on the bodyshell, and is supported on said stop. The spring force of the gas spring, which is fastened by way of its upper end to the body, is, in the completely closed state of the vehicle flap, introduced into the vehicle bodyshell again via the stop, such that, in the closed state of the vehicle flap, no spring force acts on the structure of the vehicle flap.

It is an object of the embodiments of the present invention to provide a vehicle having a vehicle bodyshell and at least one vehicle door or vehicle flap with an impact damping arrangement for damping impacts between the vehicle bodyshell and the vehicle door or vehicle flap, in the case of which vehicle at least one or more of the abovementioned disadvantages are reduced or substantially do not arise, and in the case of which vehicle, in particular, the risk of impacting of a front flap against the headlamps is prevented.

Accordingly, it is provided in this regard that the impact damper arrangement is designed such that, when the vehicle door or vehicle flap moves toward the vehicle bodyshell, the first movement section is passed through first, and then the second movement section is passed through, wherein the first movement section is arranged such that the movement along the first movement section comes to an end when the lock and the closing element come into contact with one another.

By way of the solution according to the invention, it is possible for the closing speed to be braked to a minimum speed required for the closing function in the lock, and to nevertheless ensure a secure engagement of the closing element into the lock. The closing speed is thus damped before, and only up until the point at which, the closing element strikes the lock. The operator is thus not incited to close the vehicle flap with particularly high force. The damping may also be realized in speed-dependent fashion in order to ensure that, regardless of the closing speed imparted by the operator, the minimum speed required for the reliable closure of the lock is always attained at the end of the damping, that is to say at the end of the first movement section.

Preferred embodiments and particular aspects of the embodiments of the invention will emerge from the drawings and from the present description.

According to a further aspect, a method for damping impacts between a vehicle bodyshell and a vehicle door or vehicle flap in a vehicle is specified. The method includes the steps of passing through a first movement section of the damping device, in which damping is performed, until the lock and the closing element come into contact with one another, and subsequently passing through a second movement section of the damping device, in which no damping is performed.

The provision of an impact damper arrangement according to the embodiments described here offers travel-dependent damping, and in particular travel-dependent and speed-dependent damping. In this way, damage to the first and/or second body, which are for example locked to one another but are not intended to be brought into direct contact, can be prevented. At the same time, by way of the second movement section, which does not exhibit damping, an amount of residual impact energy can be provided which is sufficient, for example, to ensure secure and reliable non-positive and/or positive engagement of the closing element with the lock.

Here, the damping begins at an early point in time and may for example come to an end approximately at the point of initial contact of the closing element with the lock. The damping travel prior to the striking of the lock can be increased in relation to conventional impact damper arrangements (e.g. 50 mm). The damping acts only prior to the time at which the lock and closing element come into contact. The speed can thus be reduced to such an extent that only the closing speed of the lock, at which the lock securely closes, remains. The impact damper arrangement according to the embodiments described here thus offers travel-dependent and speed-dependent damping.

In vehicles, it is thus possible to avoid a situation in which a long (e.g. 50 mm) plunger of the impact damper arrangement protrudes out of the flap or vehicle structure. In particular, one part (e.g. a rubber pin) may be situated on the flap, and the counterpart (the damping device, which includes the damping means) may be recessed in the bodyshell. It is thus possible for the plunger stroke to be split up, and no excessively long plunger is visible to the user. In embodiments described here, an interstice reduction on the vehicle is also possible, which, inter alia, yields an appealing appearance, because small interstices (bodyshell gaps) are regarded by the purchaser of the vehicle as being a high-quality characteristic.

Other objects, advantages and novel features of the embodiments of the present invention will become apparent from the following detailed description of one or more preferred embodiments when considered in conjunction with the accompanying drawings.

BRIEF DESCRIPTION OF THE DRAWINGS

Exemplary embodiments of the invention are illustrated in the figures and will be described in more detail below, in which:

FIG. 2 is a perspective view of the impact damper arrangement of FIG. 1, as the first movement section and the second movement section are passed through;

DETAILED DESCRIPTION OF THE DRAWINGS

Below, unless stated otherwise, the same reference designations are used for identical elements and elements of identical action.

In embodiments that may be combined with other embodiments, an impact damper arrangement in a vehicle, for the purposes of damping impacts between at least one first body, for example a vehicle door or a vehicle flap (bodyshell flap), and a second body, for example a vehicle bodyshell, is specified.

The impact damper arrangement comprises a damping device which can be arranged between the first body and the second body. The damping device has a first movement section, in which damping is performed, and a second movement section, in which no damping is performed. The impact damper arrangement is designed such that, when the first body and the second body move toward one another, the first movement section is passed through first, and then the second movement section is passed through.

The impact damper arrangement according to the embodiments described here offers travel-dependent damping, and in particular travel-dependent and speed-dependent damping. In this way, damage to the first and/or second body, which are for example intended to be placed in contact with one another, can be prevented. At the same time, by way of the second movement section, which does not exhibit damping, an amount of impact energy can be provided which is sufficient, for example, to ensure secure and reliable non-positive and/or positive engagement between the first body and the second body.

In the present disclosure, the expression "movement section" of the damping device refers generally to a section of a relative movement of two elements of the damping device with respect to one another. These may be, for example, a cylinder and a piston which is movable in the cylinder. In another example, these may be a rotatable damping means and an engagement element which engages into the damping means.

Figure 1:
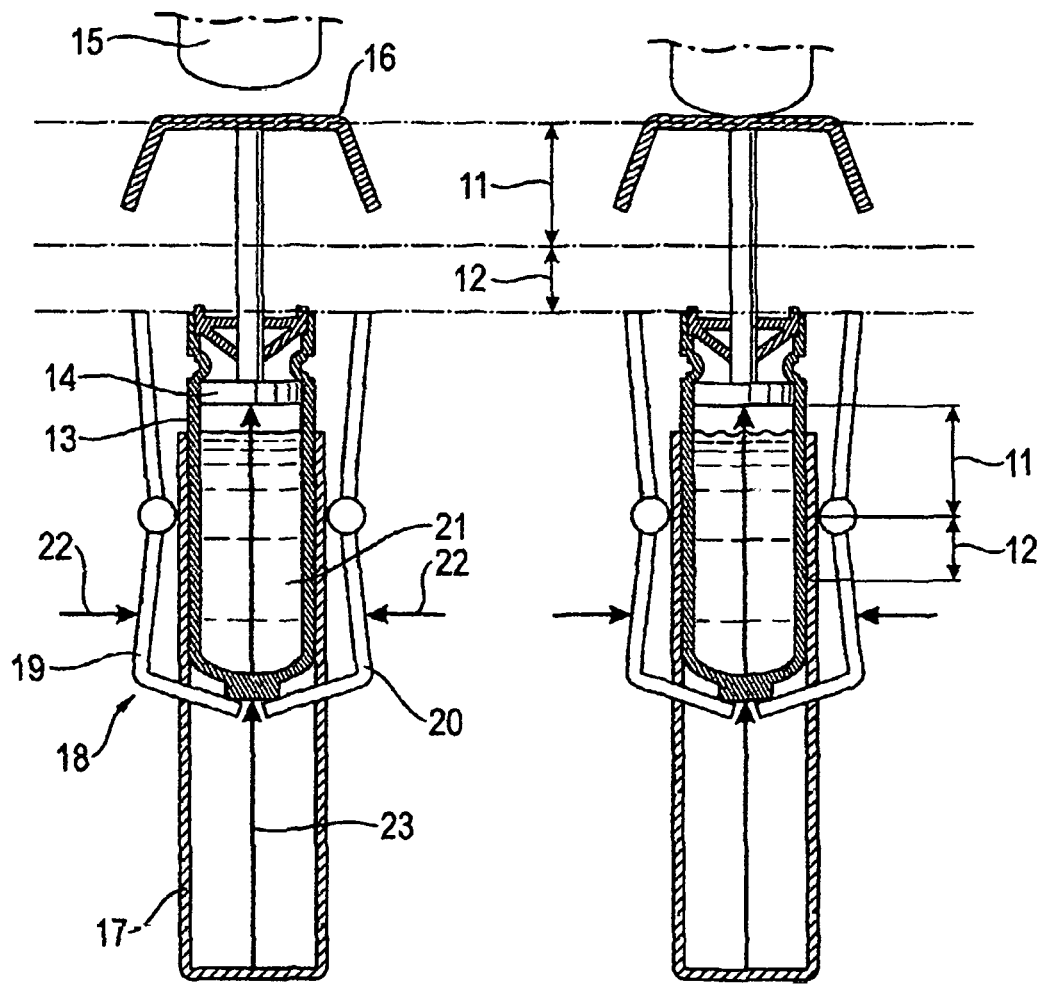
FIG. 1 is a schematic illustration of an impact damper arrangement having a translational damper.

FIG. 1 shows a schematic illustration of an impact damper arrangement 10 according to embodiments of the disclosure, having a translational damper. In the left-hand section of FIG. 1, the impact damper arrangement 10 is illustrated before it strikes, for example, a vehicle flap, and in the right-hand section of FIG. 1, the impact damper arrangement 10 is illustrated at the point at which it strikes, for example, the vehicle flap.

The impact damper arrangement 10 comprises a damping device which can be arranged between the first body and the second body. The damping device has a first movement section 11, in which damping is performed, and a second movement section 12, in which no damping is performed. The impact damper arrangement 10 is designed such that, when the first body and the second body move toward one another, the first movement section 11 is passed through first, and then the second movement section 12 is passed through.

In embodiments that may be combined with other embodiments, the damping device comprises a cylinder 13 and a piston 14 which is movable in the cylinder 13, wherein a movement travel of the piston 14 in the cylinder 13 comprises at least the first movement section 11. For example, the first movement section 11 corresponds to a first section of the inner side of the cylinder 13, and the second movement section 12 corresponds to a second section of the inner side of the cylinder 13.

Typically, the damping device is a hydraulic or pneumatic damping device. For this purpose, a liquid or a gas 21 may be present in the cylinder 13, which liquid or gas serves as a means for absorbing the impact energy in particular in the event of the first body striking the second body, and thus effects the damping.

In some embodiments, the impact damper arrangement 10 comprises a contact element 15 which can be arranged on the first body, for example on a vehicle door or vehicle flap. It may be provided that the damping device can be arranged on the second body, for example on a vehicle bodyshell. The contact element 15 may be designed such that, when the first body and the second body move toward one another, said contact element makes contact with the piston 14, or with a contact surface 16 of the piston 14, as shown in the right-hand section of FIG. 1. The damping device may in particular be designed such that, after the contact element 15 strikes the piston 14 or the contact surface 16 of the piston 14, the first movement section 11 is passed through first, and then the second movement section 12 is passed through. In some embodiments, the contact element 15 may be an adjustable stop, for example on a vehicle flap or vehicle door.

In typical embodiments, the impact damper arrangement 10 may comprise a receiving device 17 for the damping device, wherein the damping device, in particular the cylinder 13 of the damping device, is movable in the receiving device 17, wherein the movement travel of the piston 14 in the cylinder 13 may comprise the first movement section 11 and a movement travel of the damping device, in particular of the cylinder 13, in the receiving device 17 may comprise the second movement section 12. In some embodiments, the receiving device 17 may provide a guide for the damping device.

In some embodiments, the impact damper arrangement 10 comprises a holding device 18 which is designed to hold the damping device in the receiving device 17 in a first position while the first movement section 11 is being passed through and which is designed to release the damping device such that, while the second movement section 12 is being passed through, the damping device is movable in the receiving device 17.

For example, the holding device 18 may comprise a bracket with a first bracket element 19 and a second bracket element 20. The first bracket element 19 and/or the second bracket element 20 may for example be of L-shaped form, for example as a jutting pawl, such that, in a closed state, said bracket elements enclose an underside of the damping device, and in particular of the cylinder 13. In some embodiments, the holding device 18 may comprise a spring, such that a force can be exerted on the damping device (indicated by the arrow 22 in FIG. 1). In this way, the damping device can be held in the first position, as shown for example in FIG. 1. The mode of operation of the holding device 18 will be discussed in detail with reference to FIG. 2.

In typical embodiments, the impact damper arrangement 10 may comprise a spring element 23 which is designed to move the damping device in the receiving device 17 into the first position, or to hold the damping device there in particular, when no force acts on the damping device. The spring element 23 can push the damping device out again and/or move the damping device into the first position again.

In embodiments that may be combined with other embodiments, the first movement section has a length of at least 40 mm, and in particular a length of approximately 50 mm. For example, the first movement section may be a damping travel.

In embodiments that may be combined with other embodiments, the second movement section has a length of at least 20 mm and in particular a length of approximately 30 mm. For example, the second movement section may be a closing travel of a lock.

In embodiments that may be combined with other embodiments, the first body has a lock striker and the second body has a lock, which are designed to engage into one another when the first body and the second body move toward one another, wherein the first movement section corresponds to a movement section prior to the engagement. Typically, the second movement section corresponds to a movement section at least during the engagement, such that, substantially no damping is performed during the engagement. For example, the second movement section may be a closing travel of the lock.

In embodiments that may be combined with other embodiments, the impact damper arrangement comprises adjustment means for the adjustment of a damping intensity of the damping device in the first movement section. The adjustment means may comprise a thread by way of which the damping can be adjusted. For example, the thread may be adjustable, whereby a damping travel of the damping device can be varied. In this way, it is for example possible for identical dampers to be used for different vehicles.

Figure 2:
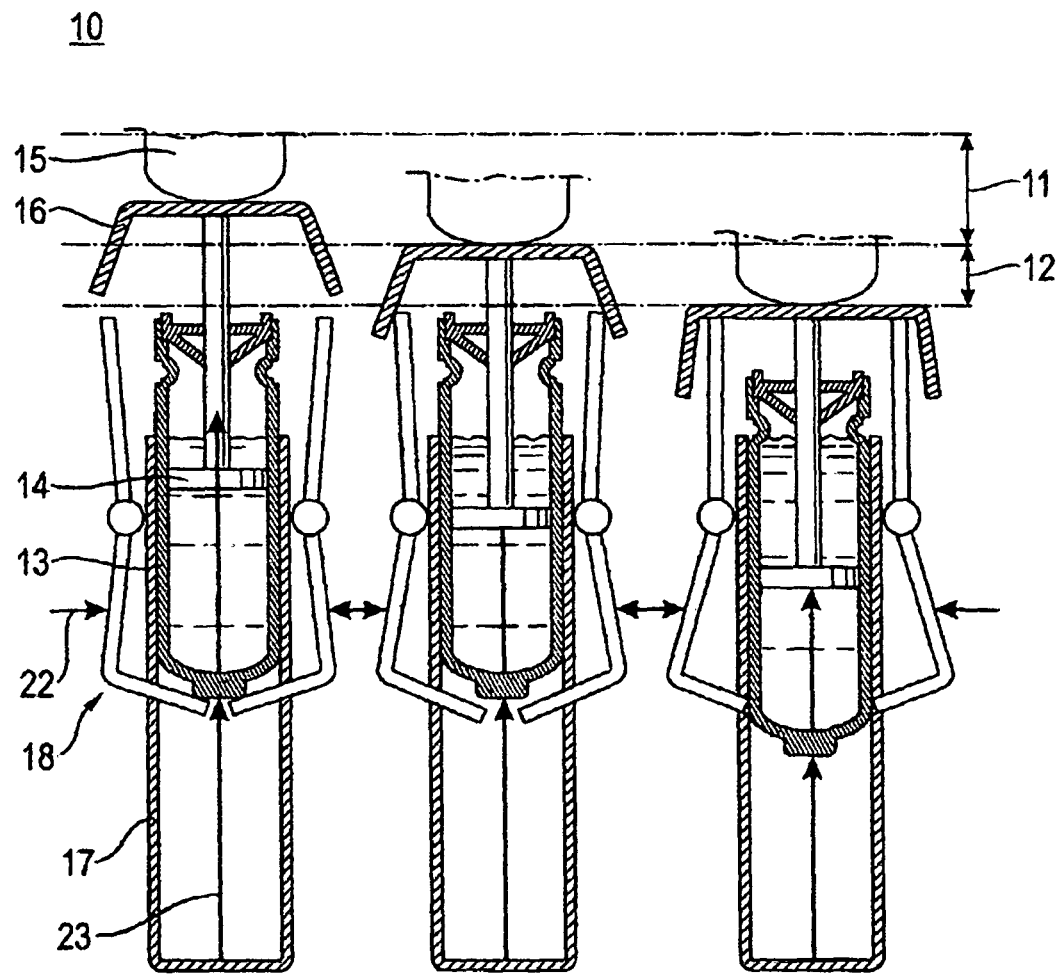

FIG. 2 shows a perspective view of the impact damper arrangement 10 of FIG. 1, as the first movement section 11 and the second movement section 12 are passed through, according to embodiments of the disclosure.

In the left-hand section of FIG. 2, the impact damper arrangement 10 is shown during the first movement section 11, that is to say during the damping of, for example, a vehicle flap. Here, the holding device 18 holds the damping device in the receiving device 17 in the first position.

In the middle section of FIG. 2, the transition from the first movement section 11 to the second movement section 12 is schematically shown. The holding device 18 is unlocked and releases the damping device, such that said damping device can move in the receiving device 18.

In the right-hand section of FIG. 2, the impact damper arrangement is shown during the second movement section 12, that is to say when no damping is performed. The holding device 18 is unlocked (the jutting pawl and the spring are open) and the damping device sinks downward. In embodiments, it is possible here for the spring element 23 to be compressed. If, for example, the vehicle flap is opened again, the spring element 23 can push the damping device out again and/or move the damping device into the first position.

Figure 3A:
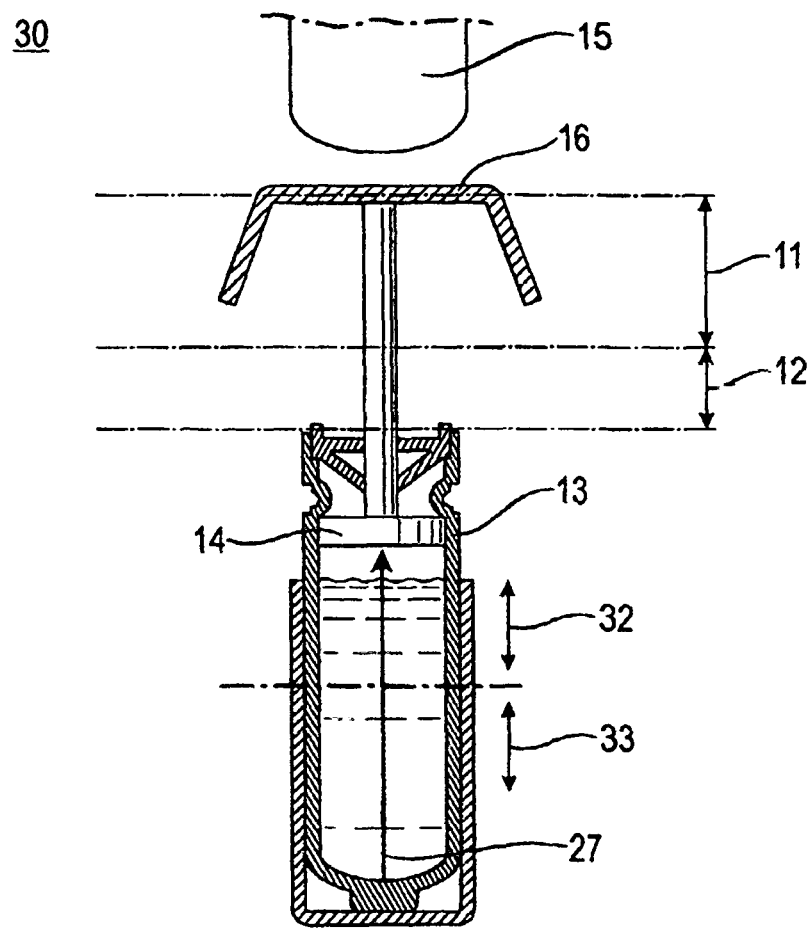
FIGS. 3A and 3B are schematic illustrations of an impact damper arrangement having a translational damper.
Figure 3B:
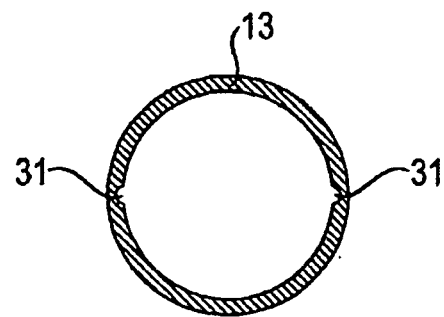

FIGS. 3A and 3B are schematic illustrations of an impact damper arrangement 30 according to further embodiments of the disclosure, having a translational damper. In particular, damping by way of the translational damper with retraction damping which varies considerably over the stroke is shown.

In some embodiments, at least one depression 31, in particular a groove, is provided on an inner side of the cylinder 13 in the second movement section. For example, the first movement section 11 corresponds to a first section 32 of the inner side of the cylinder 13, and the second movement section 12 corresponds to a second section 33 of the inner side of the cylinder 13.

In the region without grooves in the cylinder (tube), intense damping is possible (indicated by the reference designation 27). In the region with the grooves in the cylinder (tube), no damping or (very) weak damping is possible. This may be realized by virtue of for example a liquid (oil) or gas flowing around between the piston 14 and the cylinder 13 through the grooves 31. In some embodiments, the at least one depression 31 may be a pressed-in groove in the cylinder 13.

Through the provision of the depression 31 for a flow around the piston 14, fewer components are required in the wet region.

Figure 4A:
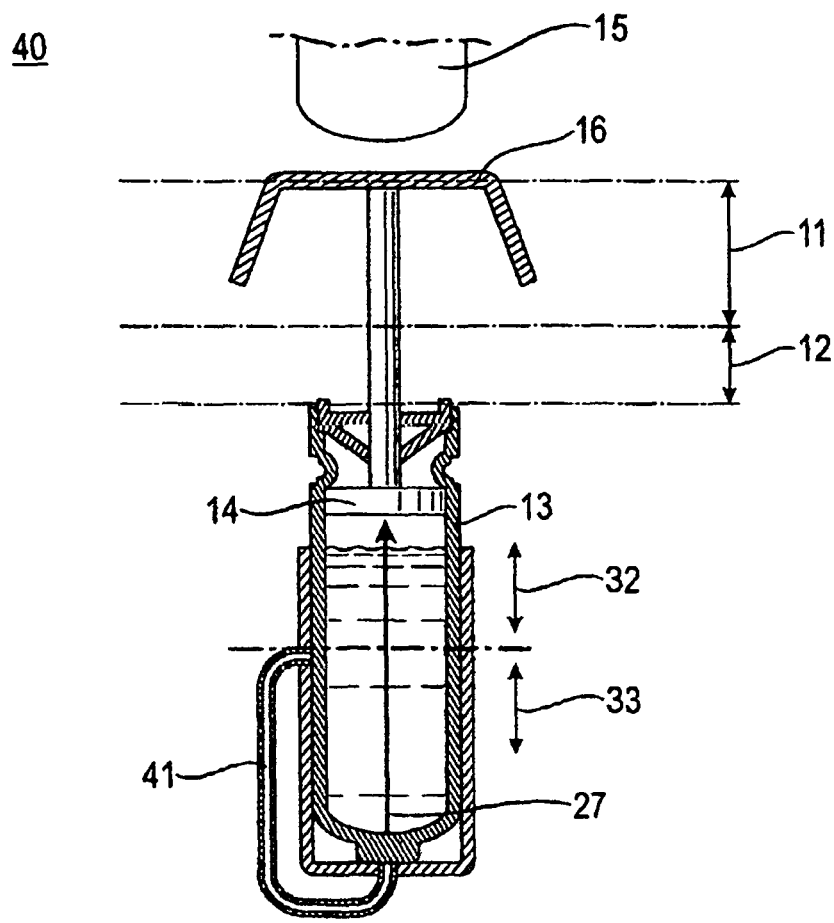
FIGS. 4A and 4B are schematic illustrations of an impact damper arrangement having a translational damper.
Figure 4B:
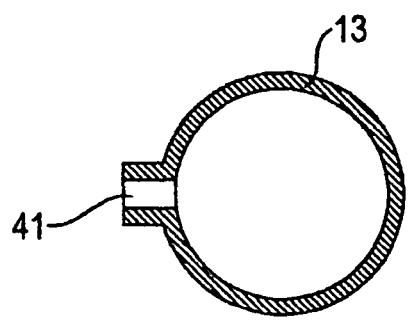

FIGS. 4A and 4B are schematic illustrations of an impact damper arrangement 40 according to further embodiments of the disclosure, having a translational damper.

In some embodiments, the damping device may comprise at least one duct 41 which is arranged on an outer side of the cylinder 13 or of the receiving device 17. The duct 41 may be a flow transfer duct. The at least one duct 41 may connect a first or upper end section of the second movement section to a second or lower end section of the second movement section. For example, the first movement section corresponds to a first section 32 of the inner side of the cylinder 13, and the second movement section corresponds to a second section 33 of the inner side of the cylinder 13.

When the piston 14 is situated in the region above an opening which produces the connection of the duct 41 to the first or upper end section of the second movement section 26, damping is possible (indicated by the reference designation 27). When the piston 14 is situated in the region below said opening, it is for example the case that a liquid (oil) or gas flows around, such that no damping or (very) weak damping is realized.

Figure 5:
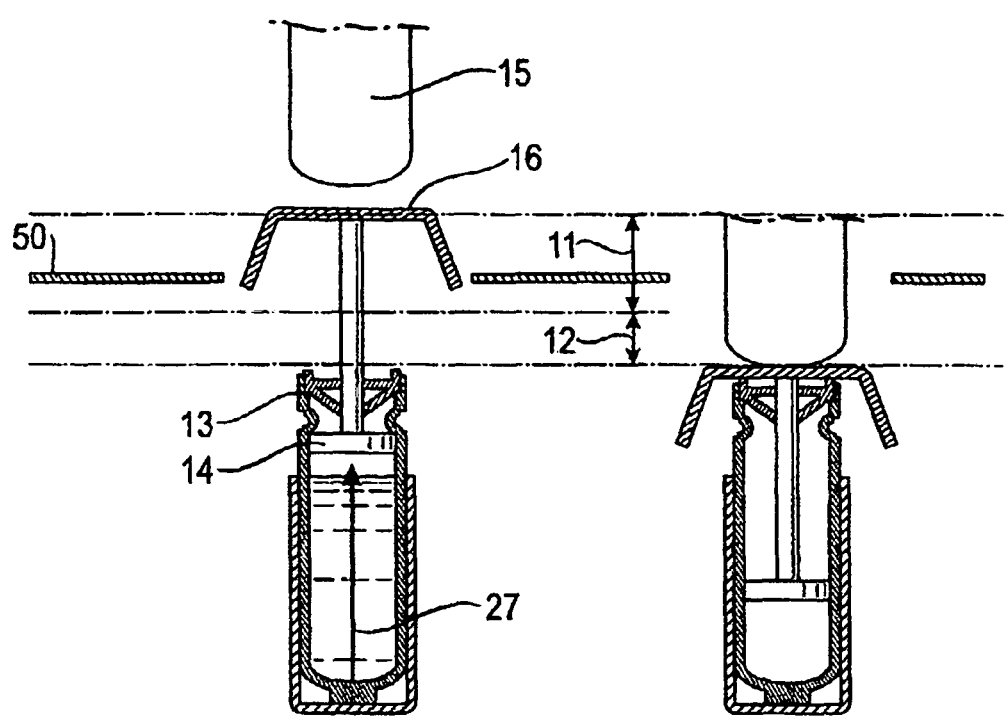
FIG. 5 is a schematic illustration of an impact damper arrangement having a translational damper, in relation to an engine hood.

FIG. 5 is a schematic illustration of an impact damper arrangement according to embodiments of the disclosure, having a translational damper, in relation to an engine hood.

In FIG. 5, the top edge of an installation location, for example of a vehicle flap (e.g. engine hood), is denoted by the reference designation 50. The left-hand section of FIG. 5 shows the impact damper arrangement before contact with the flap, and the right-hand section shows the impact damper arrangement after contact with the flap, that is to say when the flap is closed.

In the embodiments described here, it is possible to avoid a situation in which a long (e.g. 50 mm) plunger of the impact damper arrangement protrudes out of the vehicle flap or the vehicle structure or the vehicle bodyshell. In particular, one part (e.g. a rubber pin) may be situated on the flap, and the counterpart (the damping device, which comprises the damping means) may be recessed in the bodyshell. It is thus possible for the plunger stroke to be split up, and no excessively long plunger is visible to the user.

Figure 6A:
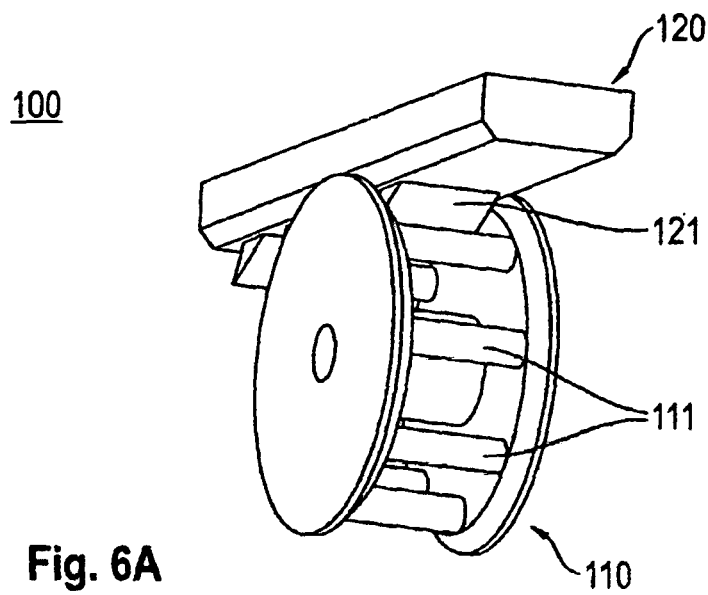
FIGS. 6A to 6C are schematic illustrations of an impact damper arrangement having a rotary damper.
Figure 6B:
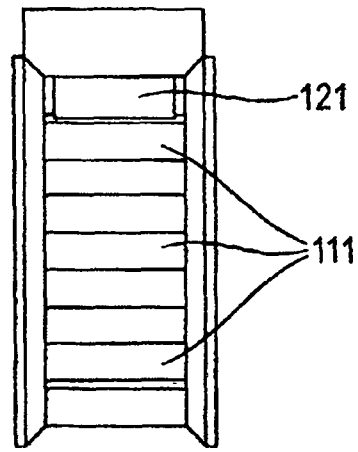
Figure 6C:
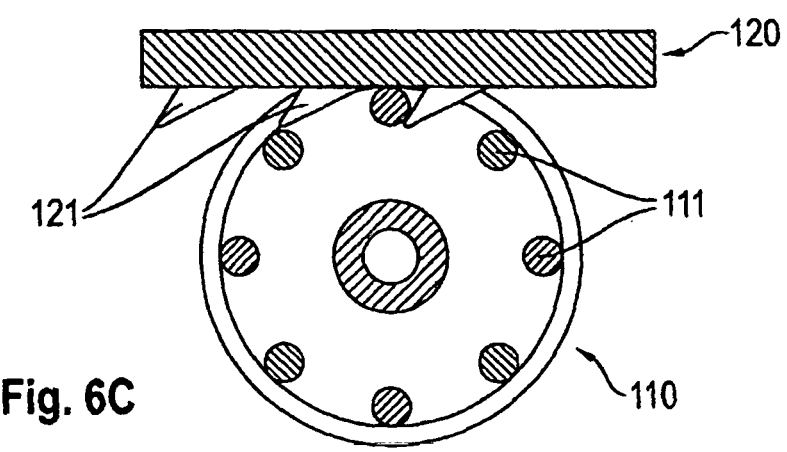

FIGS. 6A to 6C are schematic illustrations of an impact damper arrangement 100 according to further embodiments of the disclosure, having a rotary damper.

In embodiments that may be combined with other embodiments, the damping device comprises a rotatable damping means 110 with at least one first engagement element 111, and comprises a second engagement element 120. In the first movement section, the second engagement element 120 can engage into the first engagement element 111 of the rotatable damping means 110, and in the second movement section, the second engagement element 120 cannot engage into the first engagement element 111 of the rotatable damping means 110. The second engagement element 120 may comprise projections or teeth 121 which are designed to engage into the first engagement element 111 of the rotatable damping means 110.

In some embodiments, the rotatable damping means 110 may, in the first movement section, provide a restoring force which effects the damping in the first movement section.

In embodiments described here, the rotatable damping means 110 can be arranged on the second body, and/or the second engagement element 120 can be arranged on the first body.

The damping device may be a rotary damping device (>360°), and may act only in one direction (for example if no restoring action of the damper is necessary). The damping device may also be a rotary damping device (approximately 180°), and may act in both directions of rotation (for example if a restoring action of the damper is necessary).

In some embodiments, the damping device may comprise a drive wheel on the damper (hamster wheel) (rotatable damping means 110). The second engagement element 120 may be or comprise a toothed rack. The second engagement element 120 may for example be a rake with obliquely inserted teeth. Damping is performed only for as long as the teeth are in engagement. The teeth may have a self-boosting action in the damping direction, which is advantageous with respect to toothed rack and gearwheel. A restoring action can be realized by way of a spring which effects the restoring force. In this way, a restoring action is possible easily, quickly and in particular with low forces.

FIGS. 7A to 7F are schematic illustrations of impact damper arrangements according to further embodiments of the disclosure, having a rotary damper.

Figure 7A:
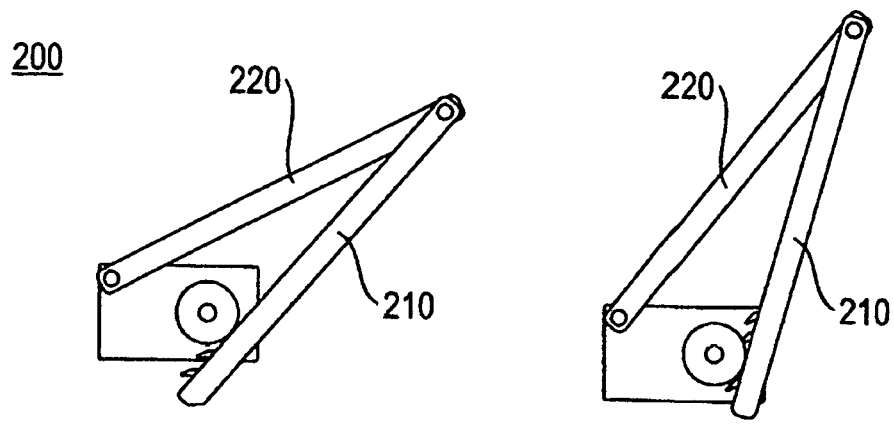
FIGS. 7A to 7F are schematic illustrations of an impact damper arrangement having a rotary damper.

FIG. 7A shows a damping device 200 with a toothed rack 210 and guide lever 220 with X-offset at the flap.

Figure 7B:
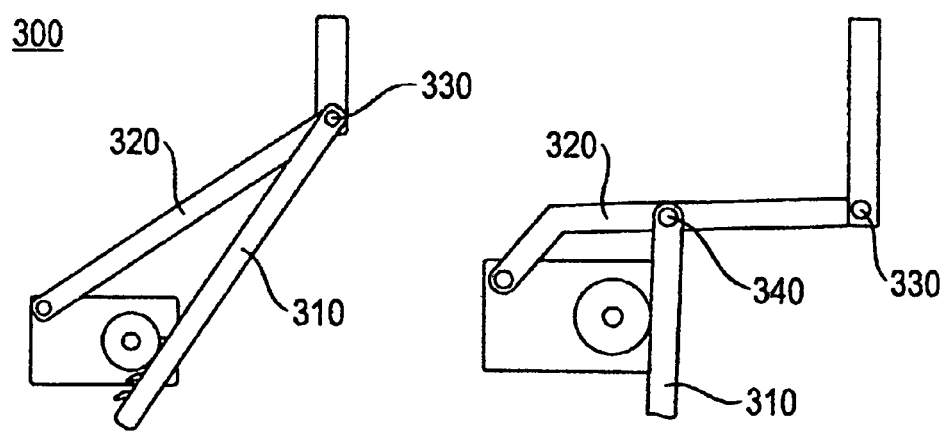

FIG. 7B shows a damping device 300 with toothed rack 310 and guide lever 320 without X-offset at the flap. In the left-hand example, toothed rack 310 and guide lever 320 are in this case fastened to a common rotary axle 330 on the flap. In the right-hand example, the toothed rack 310 is fastened to a rotary axle 340 for example at a central section of the guide lever 320, and the guide lever 320 is fastened to the rotary axle 330 on the flap (fastening with additional element).

Figure 7C:
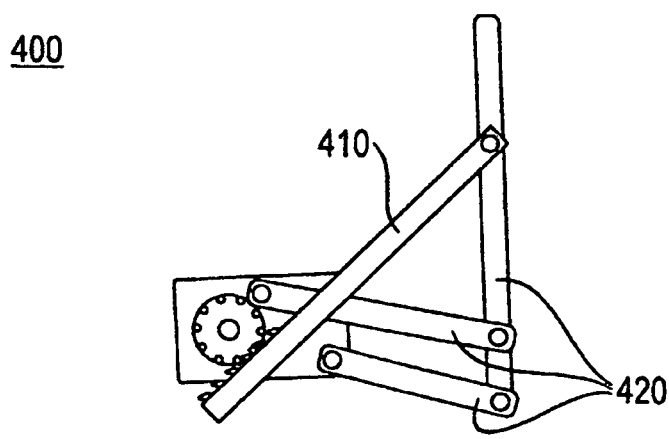

FIG. 7C shows a damping device 400 with toothed rack 410 and guide levers 420, by way of a 4-bar linkage with (very) small X-offset at the flap. The 4-bar linkage may in this case comprise three guide levers 420.

Figure 7D:
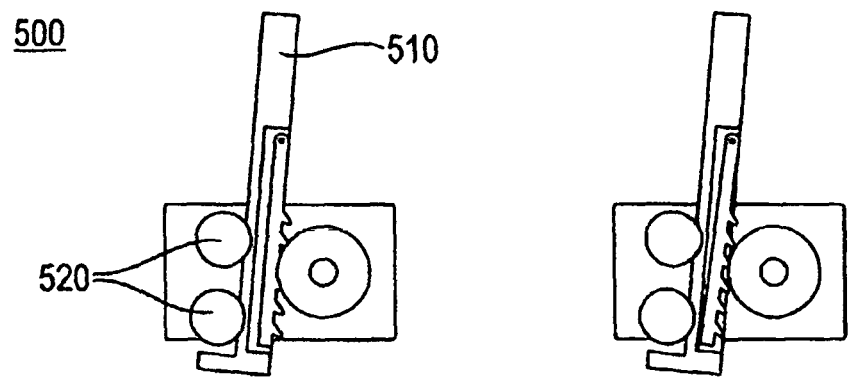

FIG. 7D shows a damping device 500 with a linear guide 520 of a toothed rack 510. The linear guide 520 may be pivotable. Furthermore, the linear guide 520 may comprise at least two guide rollers.

Figure 7E:
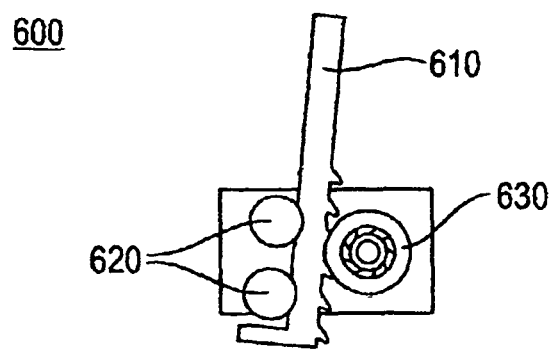

FIG. 7E shows a damping device 600 with a linear guide 620 of a toothed rack 610, wherein a ratchet 630 is arranged between damper and toothed rack 610.

Figure 7F:
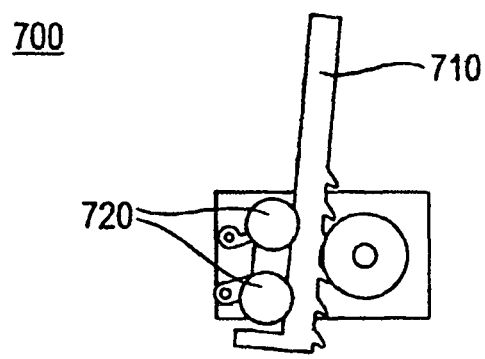

FIG. 7F shows a damping device 700 with a linear guide 720 of a toothed rack 710 with pivotable rollers.

According to a further aspect of the present disclosure, a vehicle having an impact damper arrangement as described above is specified, wherein the first body is a vehicle door or vehicle flap, and wherein the second body is a vehicle bodyshell.

According to another aspect, a method for damping impacts between at least one first body and one second body is specified, wherein a damping device is arranged between the first body and the second body. The method comprises the steps of passing through a first movement section of the damping device, in which damping is performed, and passing through a second movement section of the damping device, in which no damping is performed.

In embodiments, the method may use the impact damper arrangement described above.

In embodiments, the impact damper arrangement may be used for damping during the closing of a vehicle door or vehicle flap. Here, the damping begins at an early point in time and may for example come to an end approximately at the point at which initial lock contact occurs. The damping travel prior to the striking of the lock can be increased in relation to conventional impact damper arrangements (e.g. 50 mm). The speed-dependent damping acts only prior to the time at which the lock and lock striker come into contact. The speed can thus be reduced to such an extent that only the closing speed of the lock, at which the lock securely closes, remains. The impact damper arrangement according to the embodiments described here thus offers travel-dependent and speed-dependent damping.

By way of the impact damper arrangement according to the embodiments described here, damage can be reduced. In particular, higher closing speeds are possible without damage being caused to surrounding parts. A lower closing speed is also possible because no damping is performed during the closure of the lock. Furthermore, the impacting over travel buffers (which are intended to prevent damage) are reduced, which however merely preload the hood more intensely and increase the minimum closing speed. The preload of the buffers also increases the unlocking forces, whereby the unlocking forces are reduced. It is also possible, for example, for visually protruding plungers to be minimized. A minimization of the closing noises is possible because no intense collision of the first body and of the second body, or of parts thereof, occurs.

To avoid a situation in which a long (e.g. 50 mm) plunger of the impact damper arrangement protrudes out of the flap or vehicle structure, one part (e.g. a rubber pin) may be situated on the flap, and the counterpart (the damping device, which comprises the damping means) may be recessed in the bodyshell. It is thus possible for the plunger stroke to be split up, and no excessively long plunger is visible to the user. The damping device may for example be adjusted by way of a thread, whereby the damping travel and thus the characteristic changes. It is thus possible, for example, for identical dampers to be used for different vehicles. If a restoring action for the damper is necessary (spring), the ejector spring for the lock can be reduced. A damper characteristic may differ between retraction and deployment. In embodiments described here, an interstice reduction on the vehicle is possible, which, inter alia, yields an appealing appearance, because small interstices are often regarded by the purchaser of the vehicle as being a high-quality characteristic.

The invention is not restricted to the exemplary embodiments above, which serve merely for the general explanation of the core concept of the invention. It is rather also possible, within the scope of protection, for the device according to the invention to assume embodiments other than those described above. Here, the device may in particular have features which constitute a combination of the respective individual features of the claims.

Reference designations in the claims, in the description and in the drawings serve merely for improved understanding of the invention, and are not intended to restrict the scope of protection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle comprising:
at least one vehicle door or vehicle flap which forms a first body; and
a vehicle bodyshell which forms a second body, wherein
the vehicle door or vehicle flap is attached pivotably to the vehicle bodyshell and, in a closed state, is fixable to the vehicle bodyshell via at least one lock that interacts with a closing element, and having an impact damper arrangement that dampens impacts between the vehicle bodyshell and the vehicle door or vehicle flap during closing of the vehicle door or vehicle flap,
the impact damper arrangement has a damping device that is arranged so as to act between the vehicle bodyshell and the vehicle door or vehicle flap, impact damper arrangement having elements that are movable relative to one another along a movement travel, the movement travel of which elements has a first movement section, in which damping is performed, and a second movement section, in which no damping is performed,
the impact damper arrangement is configured such that, when the vehicle door or vehicle flap moves toward the vehicle bodyshell, the first movement section is passed through first, and then the second movement section is passed through, and
the first movement section is arranged such that the movement along the first movement section comes to an end when the lock and the closing element come into contact with one another.

2. The vehicle as claimed in claim 1, wherein the damping device of the impact damper arrangement comprises a cylinder and a piston which is movable in the cylinder, and a movement travel of the piston in the cylinder comprises at least the first movement section.

3. The vehicle as claimed in claim 2, wherein
the impact damper arrangement comprises a contact element which is arrangeable on the first body,
the damping device is arrangeable on the second body, and
the damping device is designed such that, in the event that the contact element strikes the piston, the first movement section is passed through first, and then the second movement section is passed through.

4. The vehicle as claimed in claim 3, wherein
the impact damper arrangement comprises a receiving device for the damping device,
the damping device is movable in the receiving device, and
the movement travel of the piston in the cylinder comprises the first movement section and a movement travel of the damping device in the receiving device comprises the second movement section.

5. The vehicle as claimed in claim 4, wherein the impact damper arrangement comprises a holding device which is designed to hold the damping device in the receiving device in a first position while the first movement section is being passed through and which is designed to release the damping device such that, while the second movement section is being passed through, the damping device is movable in the receiving device.

6. The vehicle as claimed in claim 5, wherein the impact damper arrangement comprises a spring element which is designed to move the damping device in the receiving device into the first position, or to hold the damping device there, when no force acts on the damping device.

7. The vehicle as claimed in claim 5, wherein the holding device is a bracket.

8. The vehicle as claimed in claim 3, wherein at least one depression is provided on an inner side of the cylinder of the damping, device portion of the impact damping arrangement in the second movement section.

9. The vehicle as claimed in claim 8, wherein the at least one depression is a groove.

10. The vehicle as claimed in claim 3, wherein the damping device of the impact damper arrangement comprises at least one duct which is arranged on an outer side of the cylinder and which connects a first end section of the second movement section to a second end section of the second movement section.

11. The vehicle as claimed in claim 10, wherein the damping device of the impact damper arrangement is a hydraulic or pneumatic damping device.

12. The vehicle as claimed in claim 1, wherein
the damping device of the impact damper arrangement comprises:
a rotatable damping means with at least one first engagement element,
a second engagement element,
in the first movement section, the second engagement element engages into the first engagement element of the rotatable damping means, and
in the second movement section, the second engagement element does not engage into the first engagement element of the rotatable damping means.

13. The vehicle as claimed in claim 12, wherein the rotatable damping means of the impact damper arrangement provides, in the first movement section, a restoring force which effects the damping in the first movement section.

14. The vehicle as claimed in claim 13, wherein the rotatable damping means of the impact damper arrangement can be arranged on the second body, and the second engagement element can be arranged on the first body.

15. The vehicle as claimed in claim 1, wherein the second movement section corresponds to a movement section at least during the engagement, such that substantially no damping is performed during the engagement.

16. The vehicle as claimed in claim 15, further comprising adjustment means for the adjustment of a damping intensity of the damping device in the first movement section.

17. A method for damping impacts between a vehicle bodyshell and a vehicle door or vehicle flap during the closing of the vehicle door or vehicle flap in a vehicle as claimed in one of the preceding claims, the method comprising the acts of:
passing through a first movement section of the damping device, in which damping is performed, until the lock and the closing element come into contact with one another, and subsequently passing through a second movement section of the damping device, in which no damping is performed.

* * * * *